(12) United States Patent
Bar-Or Tillinger et al.

(10) Patent No.: US 11,705,989 B1
(45) Date of Patent: Jul. 18, 2023

(54) HIERARCHICAL CODING SCHEME

(71) Applicant: QUALCOMM Incorporated, San Diego, CA (US)

(72) Inventors: Amit Bar-Or Tillinger, Tel-Aviv (IL); Idan Michael Horn, Hod Hasharon (IL); Shay Landis, Hod Hasharon (IL); Yehonatan Dallal, Kfar Saba (IL)

(73) Assignee: QUALCOMM Incorporated, San Diego, CA (US)

( * ) Notice: Subject to any disclaimer, the term of this patent is extended or adjusted under 35 U.S.C. 154(b) by 23 days.

(21) Appl. No.: 17/647,268

(22) Filed: Jan. 6, 2022

(51) Int. Cl.
*H04L 1/00* (2006.01)

(52) U.S. Cl.
CPC .......... *H04L 1/0061* (2013.01); *H04L 1/0057* (2013.01); *H04L 1/0072* (2013.01)

(58) Field of Classification Search
CPC ......... H03M 13/2903; H03M 13/2906; H03M 13/152; H03M 13/17; H04L 1/0005; H04L 1/0041; H04L 1/0056; H04L 1/0057; H04L 1/0061; H04L 1/0065; H04L 1/0071; H04L 1/0072
See application file for complete search history.

(56) References Cited

U.S. PATENT DOCUMENTS

| | | | | |
|---|---|---|---|---|
| 8,363,738 B2 * | 1/2013 | Gorokhov | ......... | H03M 13/2903 375/267 |
| 2018/0146382 A1 * | 5/2018 | Porat | ................... | H04L 27/3488 |
| 2020/0389345 A1 * | 12/2020 | Onggosanusi | .......... | H04L 67/62 |

* cited by examiner

*Primary Examiner* — Shelly A Chase
(74) *Attorney, Agent, or Firm* — Harrity & Harrity LLP

(57) ABSTRACT

Various aspects of the present disclosure generally relate to wireless communication. In some aspects, a wireless communication device may receive an encoded communication, the encoded communication being encoded with a hierarchical coding scheme comprising: first layer code blocks including pairs of information bits and sets of first parity bits, and second layer code blocks including sets of second parity bits, with each set of the second parity bits associated with a subset of the first layer code blocks. The wireless communication device may decode the encoded communication based at least in part on one or more of the sets of the second parity bits that are associated with one or more of the first layer code blocks determined to have failed decoding based at least in part on one or more associated sets of the first parity bits. Numerous other aspects are described.

30 Claims, 10 Drawing Sheets

HIERARCHICAL CODING SCHEME

FIELD OF THE DISCLOSURE

Aspects of the present disclosure generally relate to wireless communication and to techniques and apparatuses for communicating using a hierarchical coding scheme.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

SUMMARY

Figure 1:
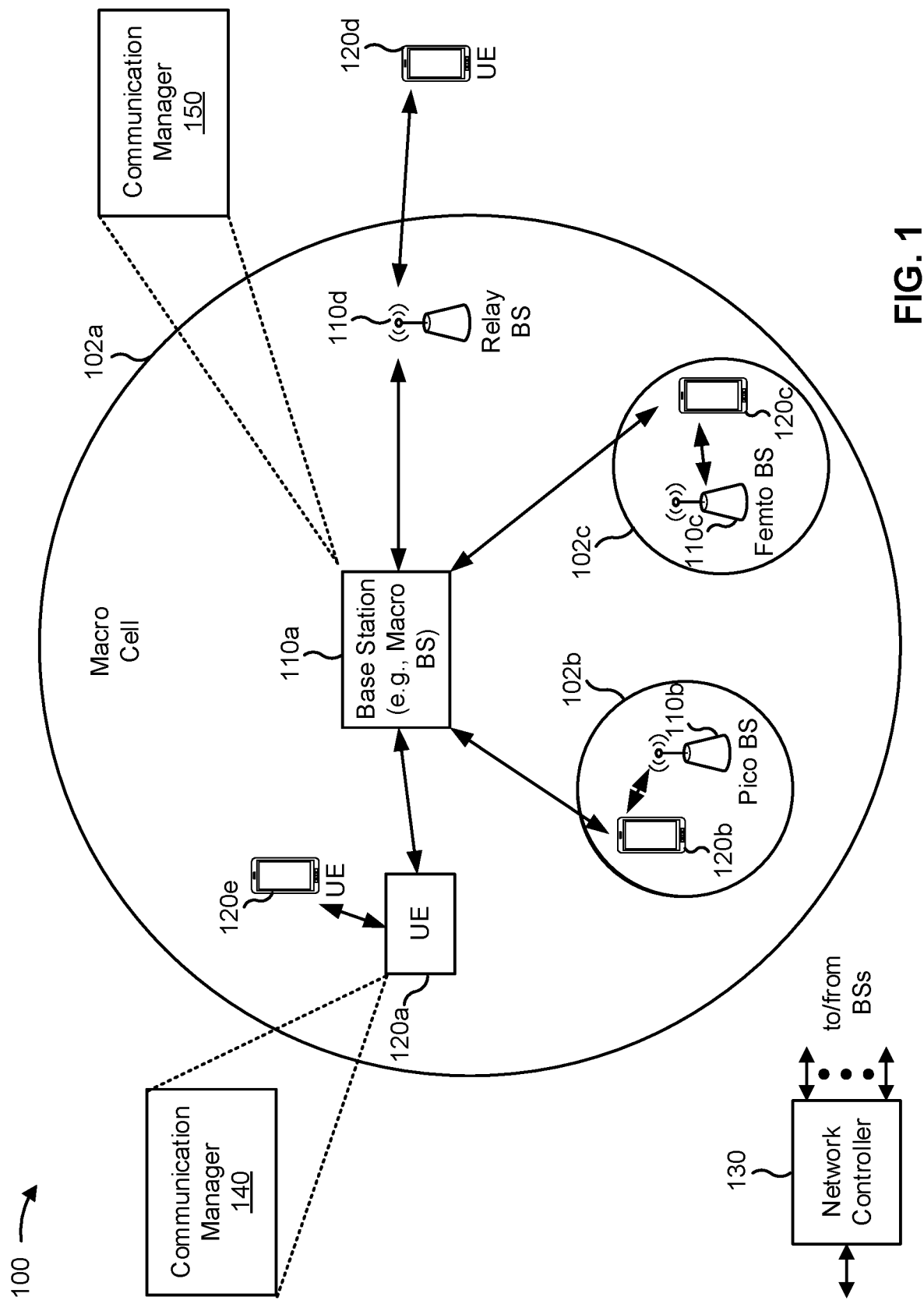
FIG. 1 is a diagram illustrating an example of a wireless network, in accordance with the present disclosure.

Some aspects described herein relate to a method of wireless communication performed by a wireless communication device. The method may include receiving an encoded communication, the encoded communication being encoded with a hierarchical coding scheme comprising first layer code blocks including pairs of information bits and sets of first parity bits, and second layer code blocks including sets of second parity bits, with each set of the second parity bits associated with a subset of the first layer code blocks. The method may include decoding the encoded communication based at least in part on one or more of the sets of the second parity bits that are associated with one or more of the first layer code blocks determined to have failed decoding based at least in part on one or more associated sets of the first parity bits.

Some aspects described herein relate to a wireless communication device for wireless communication. The wireless communication device may include a memory and one or more processors coupled to the memory. The one or more processors may be configured to receive an encoded communication, the encoded communication being encoded with a hierarchical coding scheme comprising. The one or more processors may be configured to decode the encoded communication based at least in part on one or more of the sets of the second parity bits that are associated with one or more of the first layer code blocks determined to have failed decoding based at least in part on one or more associated sets of the first parity bits.

Some aspects described herein relate to a non-transitory computer-readable medium that stores a set of instructions for wireless communication by a wireless communication device. The set of instructions, when executed by one or more processors of the wireless communication device, may cause the wireless communication device to receive an encoded communication, the encoded communication being encoded with a hierarchical coding scheme comprising. The set of instructions, when executed by one or more processors of the wireless communication device, may cause the wireless communication device to decode the encoded communication based at least in part on one or more of the sets of the second parity bits that are associated with one or more of the first layer code blocks determined to have failed decoding based at least in part on one or more associated sets of the first parity bits.

Some aspects described herein relate to an apparatus for wireless communication. The apparatus may include means for receiving an encoded communication, the encoded communication being encoded with a hierarchical coding scheme comprising first layer code blocks including pairs of information bits and sets of first parity bits, and second layer code blocks including sets of second parity bits, with each set of the second parity bits associated with a subset of the first layer code blocks. The apparatus may include means for decoding the encoded communication based at least in part on one or more of the sets of the second parity bits that are associated with one or more of the first layer code blocks determined to have failed decoding based at least in part on one or more associated sets of the first parity bits.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a wireless communication device may include a communication manager 150 (e.g., based at least in part on the wireless communication device comprising, or being comprised in, a base station 110) or communication manager 140 (e.g., based at least in part on the wireless communication device comprising, or being comprised in, a UE 120). As described in more detail elsewhere herein, the communication manager 150 or communication manager 140 may receive an encoded communication, the encoded communication being encoded with a hierarchical coding scheme comprising: first layer code blocks including pairs of information bits and sets of first parity bits, and second layer code blocks including sets of second parity bits, with each set of the second parity bits associated with a subset of the first layer code blocks; and decode the encoded communication based at least in part on one or more of the sets of the second parity bits that are associated with one or more of the first layer code blocks determined to have failed decoding based at least in part on one or more associated sets of the first parity bits. Additionally, or alternatively, the communication manager 150 or communication manager 140 may perform one or more other operations described herein.

As indicated above, FIG. 1 is provided as an example. Other examples may differ from what is described with regard to FIG. 1.

Figure 2:
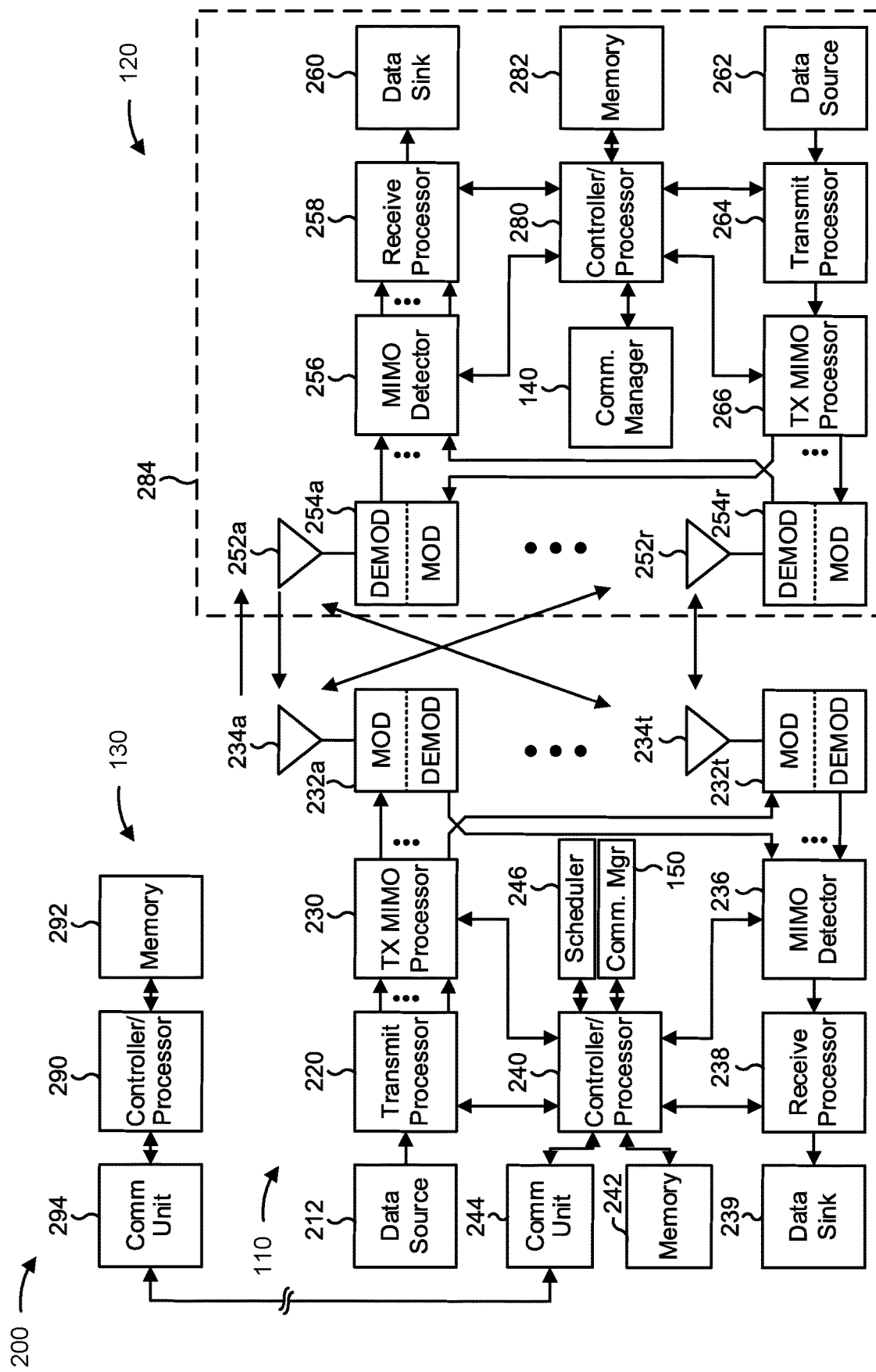
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples.

An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-10).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-10).

The controller/processor 240 of the base station 110, the controller/processor 280 of the UE 120, and/or any other component(s) of FIG. 2 may perform one or more techniques associated with a hierarchical coding scheme, as described in more detail elsewhere herein. In some aspects, the wireless communication device described herein is the base station 110, is included in the base station 110, or includes one or more components of the base station 110 shown in FIG. 2. In some aspects, the wireless communication device described herein is the UE 120, is included in the UE 120, or includes one or more components of the UE 120 shown in FIG. 2. For example, the controller/processor 240 of the base station 110, the controller/processor 280 of the UE 120, and/or any other component(s) of FIG. 2 may perform or direct operations of, for example, process 800 of FIG. 8 and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, and/or other processes as described herein. In some examples, executing instructions may include running the instructions, converting the instructions, compiling the instructions, and/or interpreting the instructions, among other examples.

In some aspects, the wireless communication device includes means for receiving an encoded communication, the encoded communication being encoded with a hierarchical coding scheme comprising: first layer code blocks including pairs of information bits and sets of first parity bits, and second layer code blocks including sets of second parity bits, with each set of the second parity bits associated with a subset of the first layer code blocks; and/or means for decoding the encoded communication based at least in part on one or more of the sets of the second parity bits that are associated with one or more of the first layer code blocks determined to have failed decoding based at least in part on one or more associated sets of the first parity bits. In some aspects, the means for the wireless communication device to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246. In some aspects, the means for the wireless communication device to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
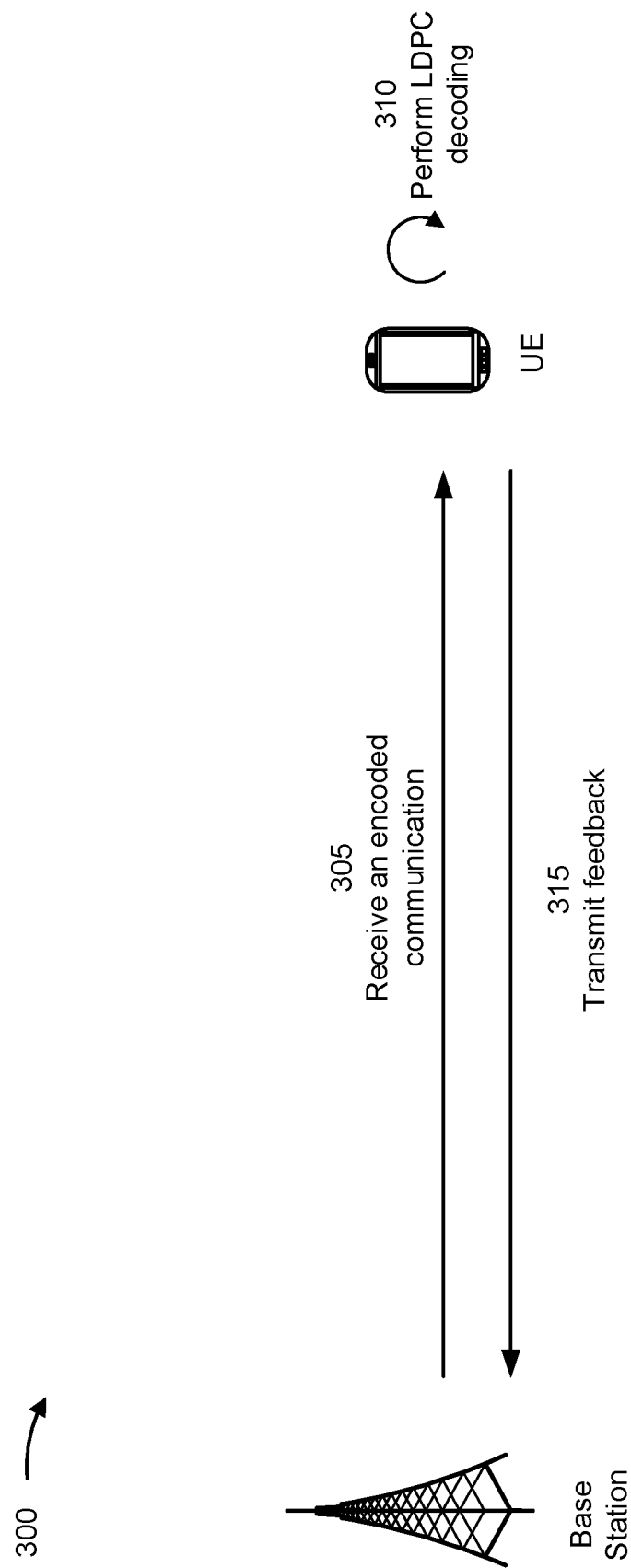
FIG. 3 is a diagram illustrating an example of communicating an encoded communication, in accordance with the present disclosure.

FIG. 3 is a diagram illustrating an example 300 of communicating an encoded communication, in accordance with the present disclosure. As shown in FIG. 3, a base station and a UE may communicate via a wireless communication link.

As shown by reference number 305, the UE may receive, and the base station may transmit, an encoded communication. The encoded communication may be encoded based at least in part on a low density parity check (LDPC) coding scheme.

As shown by reference number 310, the UE may perform LDPC decoding on the encoded communication. After attempting to decode the encoded communication, the UE may generate a feedback message (e.g., a hybrid automatic repeat request (HARQ) acknowledgment (HARQ-ACK) message, among other examples).

As shown by reference number 315, the UE may transmit feedback (e.g., the generated feedback message) to the base station. The feedback may indicate that the encoded communication was correctly received and decoded (e.g., the UE was able to obtain a payload of information bits from the encoded communication) or that the encoded communication failed to be correctly received and decoded.

Communicating the encoded communication as shown in FIG. 3 consumes power resources of the UE, which may increase linearly with increased bandwidths and/or increased data flow rates. In sub-terahertz communication bands (e.g., FR4 or FR5) in which bandwidths are larger and/or a number of streams may be greater when compared to FR1 bands, the UE may consume exponentially increasing power resources and computing resources to receive and decode communications. In some wireless communication devices, a channel decoder may account for 50% or more of power consumption associated with wireless communication. In these wireless communication devices, an exponentially increased power consumption may render the wireless communication devices unsuited for wireless communication.

In some aspects described herein, wireless communication devices may communicate using a hierarchical coding scheme. For example, the hierarchical coding scheme may include a Bose-Chaudhuri-Hocquenghem (BCH) hierarchical coding scheme. The wireless communication devices may use the hierarchical coding scheme for all communications, or communications using one or more high-frequency bands (e.g., FR3 or FR4, among other examples), among other examples. Based at least in part on using the hierarchical coding scheme, a receiving device may consume reduced computing resources based at least in part on the hierarchical coding scheme having reduced complexity, and may consume reduced power resources when compared to an LDPC coding scheme. Additionally, or alternatively, the receiving device may provide feedback with increased resolution (e.g., without additional cyclic redundancy check (CRC) overhead) to reduce power, computing, network, and communication resources to re-transmit portions of an encoded communication that were incorrectly received.

In some aspects, information bits of an encoded communication may be encoded in a hierarchical manner having different levels with different parity bits. For example, at level 0 (L0), the information bits may be segmented into blocks with k bits per block, where each block is hierarchically encoded with code (n1, k, t1), where n1 is a length of an L0 code block after encoding, k is a number of information bits included in L0 code blocks, n1−k is a number of parity bits of the L0 code blocks, and t is a number of error correcting bits of the L0 code blocks which represent an error correcting capability of the L0 code blocks (e.g., a maximum number of bits that may be incorrectly received while allowing the receiving device to detect the information bits correctly). The value of t1 is based at least in part on the bits k and the code length n1.

At level 1 (L1), M0 consecutive information blocks are aggregated and encoded with code (n2, M0*k, t2), where M0 is a number of aggregated L0 code blocks, n2 is a code length of the L1 code block after L1 encoding, n2−M0*k is a number of parity bits in L1 code blocks, and t2 is a number of error correcting bits of the L1 code blocks.

Higher levels (L2, L3, etc.) may be formed in a similar manner. Each level of the hierarchical coding scheme may have a higher error correction capability t than a lower level of the hierarchical coding scheme. For example, t1 may be greater than t0.

In some aspects, a number of error correcting bits increases with the hierarchy levels:

$$t_{p+1} > t_p$$

Additionally, or alternatively, a parity overhead, per block of k bits, may decrease with the hierarchy levels:

$$\frac{n_{p+1} - k \cdot \prod_{j=0}^{p} M_j}{k \cdot \prod_{j=0}^{p} M_j} < \frac{n_p - k \cdot \prod_{j=0}^{p-1} M_j}{k \cdot \prod_{j=0}^{p-1} M_j}$$

The hierarchical coding scheme may be used for scenarios where only a few code blocks fail (e.g., due to a frequency selectivity of a channel and/or a noise imbalance, among other examples). The hierarchical coding scheme may support correcting all possible code blocks of hierarchy level p, such that most decoding will be performed on short code blocks (e.g., L0 or L1 code blocks) with low error correction capability, which will result in relatively low power consumption. The receiving device may use code of hierarchy level p+1 to correct errors remaining after error correction was performed at level p.

In addition, HARQ-ACK feedback may be signaled with a mixture of hierarchy levels in order to improve control of low feedback signaling and higher resolution of the feedback. In some aspects, if a number of errors in the code block is larger than an error correcting capability, BCH decoder failure may be known by the wireless communication devices without using a CRC approach (e.g., as long as error correction capability is large enough, the probability of correcting to an incorrect code block is reduced to 1/t (power)).

In some aspects, the hierarchical coding scheme may be configured such that one or more levels of the hierarchical coding scheme (e.g., higher levels) apply to sets of information bits received over multiple slots. For example, with a target block error rate (BLER) of 10%, higher levels of the hierarchical coding scheme may not be needed for decoding most code blocks. When one or more code blocks of a slot fail, code blocks of other slots are unlikely to also fail, and higher levels of the hierarchical coding scheme may be used to correct the failing code blocks in the failing slot.

For example, L0 and L1 of the hierarchical coding scheme may be used within single slots, whereas L2 may be shared between multiple slots (e.g., a first slot and a second slot). If slot k fails, the receiving device may not need to send a NACK immediately, and can wait for slot k+1. If L0 and L1 can correctly decode slot k+1, the receiving device may use L2 to recover slot k. In this way, the receiving device may request a re-transmission only when all levels of BCH codes are exhausted and one or more code blocks are still not correctly received.

In some aspects, the hierarchical coding scheme may configured such that one or more levels of the hierarchical coding scheme (e.g., higher levels) apply to multiple downlink control information (DCI) messages. For example, with a target BLER of below 1% for DCI messages and with other communication parameters configured to protect robustness of DCI messages, higher levels of the hierarchical coding scheme may not be needed for decoding most DCI messages. In this way, if a second DCI message fails, usually a first DCI message will not fail and the one or more levels of the hierarchical coding scheme may be used to correct failing code blocks in the second DCI message.

For example, L0 and L1 may be used within single DCI messages (e.g., a first or second), whereas L2 may be shared between the two DCI messages. The receiving device may attempt to decode L0 from the first DCI message. If decoding using only L0 fails, the receiving device may decode the first DCI message using L0 and L1 parity bits. Based at least in part on the first DCI message passing CRC (e.g., after attempting to decode using L0 and L1 parity bits), the receiving device may decode L0 from the second DCI message. If decoding using only L0 fails, the receiving device may decode the second DCI using L0 and L1 parity bits. If decoding using only L0 and L1 parity bits fails, the receiving device may decode the second DCI using L0, L1, and L2 parity bits from both DCI messages. In some aspects, this examples may be applied to more code blocks such as physical downlink control channel (PDCCH) code blocks with the 2 DCI messages example described above, a multiple-slot DCI message, or code blocks associated with other communication channels.

Figure 4:
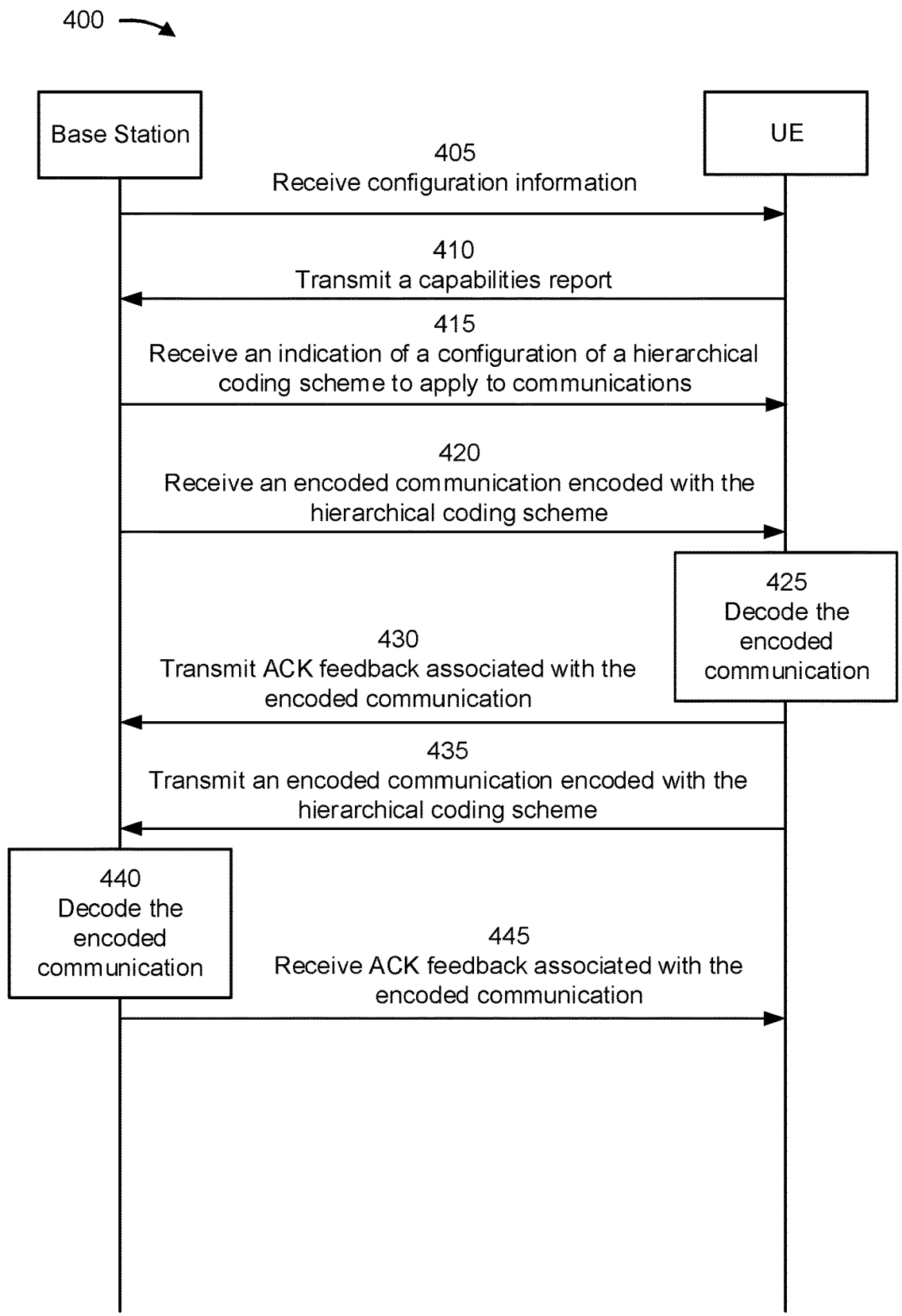
FIGS. 4-7 are diagrams illustrating examples associated with a hierarchical coding scheme, in accordance with the present disclosure.

FIG. 4 is a diagram of an example 400 associated with communicating using a hierarchical coding scheme, in accordance with the present disclosure. As shown in FIG. 4, a base station (e.g., base station 110) may communicate with a UE (e.g., UE 120). In some aspects, the base station and the UE may be part of a wireless network (e.g., wireless network 100). The UE and the base station may have established a wireless connection prior to operations shown in FIG. 4. In some aspects, the UE and the base station may communicate in a high-frequency band, such as FR3 or FR4 or higher.

As shown by reference number 405, the base station may transmit, and the UE may receive, configuration information. In some aspects, the UE may receive the configuration information via one or more of radio resource control (RRC) signaling, one or more medium access control (MAC) control elements (CEs), and/or downlink control information (DCI), among other examples. In some aspects, the configuration information may include an indication of one or more configuration parameters (e.g., already known to the UE and/or previously indicated by the base station or other network device) for selection by the UE, and/or explicit configuration information for the UE to use to configure the UE, among other examples.

In some aspects, the configuration information may indicate that the UE is to communicate with the base station using a hierarchical coding scheme. In some aspects, the configuration information may indicate that the UE is to transmit an indication of a capability to communicate using a hierarchical coding scheme. In some aspects, the configuration information may indicate that the UE is to use a configuration of the hierarchical coding scheme as indicated by the base station.

The UE may configure itself based at least in part on the configuration information. In some aspects, the UE may be configured to perform one or more operations described herein based at least in part on the configuration information.

As shown by reference number 410, the UE may transmit, and the base station may receive, a capabilities report. In some aspects, the capabilities report may indicate UE support for communicating using a hierarchical coding scheme (e.g., a Bose-Chaudhuri-Hocquenghem hierarchical coding scheme). In some aspects, the capabilities report may indicate one or more parameters that the UE is capable of using in the hierarchical coding scheme, such as a number of layers or a size (e.g., number of code blocks aggregated in a subsequent layer), among other examples.

As shown by reference number 415, the UE may receive, and the base station may transmit, an indication of a configuration of the hierarchical coding scheme to apply to communications. In some aspects, the configuration may indicate a number of the first layer code blocks, a number of the first layer code blocks associated with each of the second layer code blocks, a number of the second layer code blocks, a number of bits of the first parity bits associated with a first layer code block (e.g., a number of the first parity bits for each first layer code block), a number of bits of the second parity bits associated with a second layer code block (e.g., a number of the second parity bits for each second layer code block), and/or a number of layers of the hierarchal coding scheme, among other examples.

In some aspects, the configuration may indicate that codes blocks associated with the encoded communication are systematic. For example, input data of the encoded communication may be embedded in encoded output. In this way, the encoded communication includes pairs of information bits and sets of first parity bits, with each pair being systematic code.

In some aspects, the hierarchical coding scheme may be applied to non-systematic code, such that each of the n1 bits of the first layer will not necessarily include I information bits, but n1 encoded bits (e.g., with the n1 encoded bits being generated from the k bits using (n1,k,t) code). In a similar manner, code blocks of other layers may also be non-systematic and the encoded communication may include any general n2−M0*k parity bits for the other layers. In these instances, the M0*k information bits may not be transmitted.

As shown by reference number 420, the UE may receive, and the base station may transmit, an encoded communication that is encoded with the hierarchical coding scheme. In some aspects, the hierarchical coding scheme may include first layer code blocks including pairs of information bits and sets of first parity bits. For example, each code block may include information bits and a matching set of first parity bits. In some aspects, each set of information bits (e.g., information bits of an individual code block) may be paired with the same parity bits (e.g., the same parity bits may be included in each individual code block, or the individual code blocks may include only a set of information bits and may be associated with the same parity bits that are not transmitted within the individual code blocks). In some aspects, the first layer may include code blocks of information bits (e.g., encoded information bits) that all map to a same set of parity bits. In this way, the code blocks may be systematic code blocks or non-systematic code blocks. The hierarchical coding scheme may also include second layer code blocks that include sets of second parity bits. Each set of the second parity bits may be associated with a subset of the first layer code blocks. For example, a second layer code block may be associated with (e.g., as a parent block) multiple first layer code blocks.

In some aspects, the first parity bits are associated with a capability to correct a first number of incorrectly received bits of the information bits and the second parity bits are associated with a capability to correct a second number of incorrectly received bits of the information bits. For example, first level coding may be associated with a capability to correct a first number of incorrectly received bits of the information bits, and the second level coding may be associated with a capability to correct a second number of incorrectly received bits of the information bits. In some aspects, the second number is greater than the first number, such that higher layers of the hierarchical coding scheme have a greater capability to correct incorrectly received bits of the information bits.

In some aspects, a number of the first parity bits included in the first layer code blocks (e.g., a number of first parity bits in each of the first layer code blocks) is less than a number of second parity bits included in the second layer code blocks. However, the number of second parity bits included in a second layer code block may be less than a total number of first parity bits of first layer code blocks associated with the second layer code block (e.g., as child code blocks).

In some aspects, the UE may receive the encoded communication over multiple slots. For example, the encoded communication may be a multi-slot communication. The hierarchical coding scheme may include a third layer code block of the encoded communication that includes a set of third parity bits that is associated with a set of the second layer code blocks. The set of the second layer code blocks may be received over multiple slots such that the third parity bits are associated with multiple slots. In some aspects, the UE may receive the set of third parity bits over each of the multiple slots, may receive the set of third parity bits over a subset of the multiple slots, or may receive different portions of the set of the third parity bits over the multiple slots.

In some aspects, the set of the third parity bits that are associated with groups of the set of the second parity bits may be associated with the encoded communication and an additional encoded communication. For example, the set of the third parity bits may be associated with multiple encoded communications or a single multi-slot communication. In some aspects, the encoded communication may include a first DCI message and the additional communication may include a second DCI message. For example, the first DCI message may include a first stage DCI message, and the second DCI message may include a second stage DCI message of a two-stage DCI message. In this way, the UE may attempt to decode the second stage DCI message using parity bits associated with the first stage DCI message, to improve a likelihood of passing CRC.

In some aspects, the UE may wait until receiving all of the multiple slots before transmitting ACK feedback to the base station associated with the encoded communication. In this way, the UE may attempt to decode any failed code blocks using the third parity bits of the third layer code block before transmitting a NACK.

As shown by reference number 425, the UE may decode the encoded communication. For example, the UE may apply the configuration of the hierarchical coding scheme to the encoded communication. The UE may first attempt to decode the information bits using the first parity bits. The UE may determine which first layer code blocks failed CRC after using the first parity bits and may attempt to decode the information bits associated with the first layer code blocks that failed CRC using the second parity bits of a second layer code block that is associated with (e.g., as a parent code block) the first layer code blocks that failed CRC. For example, the UE may decode the encoded communication based at least in part on one or more of the sets of the second parity bits that are associated with one or more of the first layer code blocks determined to have failed decoding based at least in part on one or more associated sets of the first parity bits.

As shown by reference number 430, the UE may transmit, and the base station may receive, ACK feedback associated with the encoded communication. In some aspects, the ACK feedback may indicate an ACK and/or a NACK associated with multiple layers of the hierarchical coding scheme. In some aspects, the ACK feedback may be configured to indicate ACK or NACK for different layers of the hierarchical coding scheme in a single ACK feedback message.

As shown by reference number 435, the UE may transmit, and the base station may receive, an encoded communication that is encoded with the hierarchical coding scheme. In some aspects, the UE may transmit the encoded communication, and the base station may receive the encoded communication, based at least in part on the configuration of the hierarchical coding scheme as indicated in connection with reference number 415.

As shown by reference number 440, the base station may decode the encoded communication. For example, the base station may apply the configuration of the hierarchical coding scheme to the encoded communication as described in connection with the UE applying the configuration of the hierarchical coding scheme in reference number 425.

As shown by reference number 445, the base station may transmit, and the UE may receive, ACK feedback associated with the encoded communication. For example, the base station may transmit the ACK feedback as described in connection with the UE transmitting the ACK feedback for a downlink communication in reference number 430.

Based at least in part on communicating using the hierarchical coding scheme, the base station and the UE may consume reduced computing resources based at least in part on the hierarchical coding scheme having reduced complexity when compared to an LDPC coding scheme. Additionally, or alternatively, the UE and the base station may consume reduced power resources when compared to an LDPC coding scheme.

Additionally, or alternatively, the receiving device may provide feedback with increased resolution (e.g., without additional CRC overhead) to reduce power, computing, network, and communication resources to re-transmit portions of an encoded communication that were incorrectly received.

As indicated above, FIG. 4 is provided as an example. Other examples may differ from what is described with regard to FIG. 4.

Figure 5:
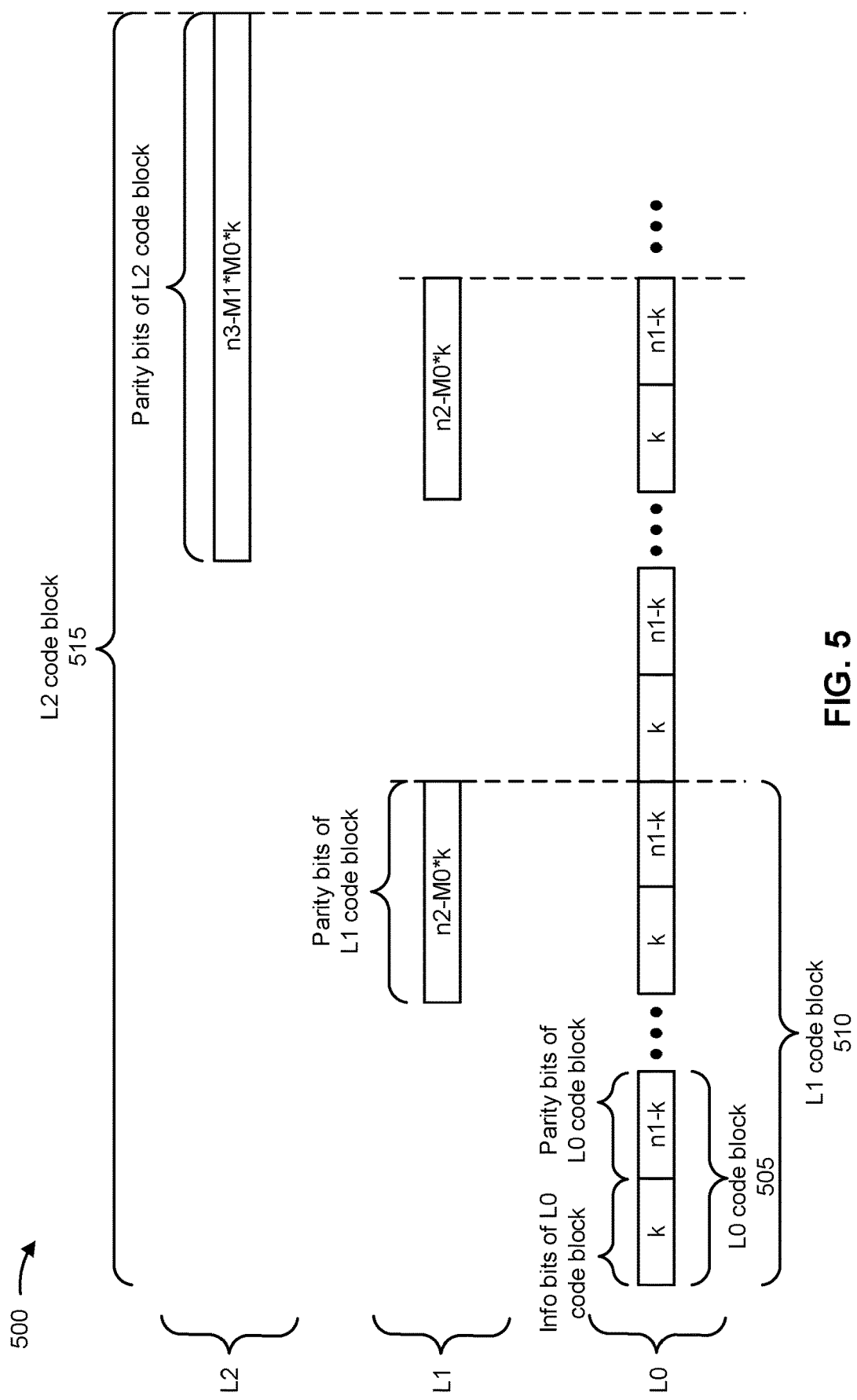

FIG. 5 is a diagram of an example 500 associated with communicating using a hierarchical coding scheme, in accordance with the present disclosure. As shown in FIG. 5, wireless communication devices (e.g., base station 110 and/or UE 120) may communicate using the hierarchical coding scheme. In some aspects, the wireless communication devices may be part of a wireless network (e.g., wireless network 100). The wireless communication devices may have established a wireless connection prior to operations shown in FIG. 5. In some aspects, the wireless communication devices may communicate in a high-frequency band, such as FR3 or FR4 or higher.

As shown in FIG. 5, the hierarchical coding scheme may include multiple L0 code blocks 505 at a layer 0 (e.g., first layer) of the hierarchical coding scheme. An L0 code block includes k information bits of the L0 code block and (n1−k) L0 parity bits of the L0 code block.

The hierarchical coding scheme may also include multiple L1 code blocks 510 at layer 1 (e.g., second layer) of the hierarchical coding scheme. An L1 code block includes (n2−M0*k) L1 parity bits of the L1 code block. The L1 code block may be associated with multiple L0 code blocks (e.g., as a parent code block to multiple L0 child code blocks). The L1 parity bits may be used to correct information blocks of any of the L0 code blocks associated with the L1 code block.

The hierarchical coding scheme may also include one or more L2 code blocks 515 at layer 2 (e.g., a third layer) of the hierarchical coding scheme. An L2 code block includes (n3−M1*M0*k) L2 parity bits of the L2 code block. The L2 code block may be associated with multiple L1 code blocks (e.g., as a parent code block to multiple L1 child code blocks). The L2 parity bits may be used to correct information blocks of any of the L0 code blocks associated with any of the L1 code blocks that are associated with the L2 code block (e.g., L0 code blocks that are grandchildren of the L2 code block).

As indicated above, FIG. 5 is provided as an example. Other examples may differ from what is described with regard to FIG. 5.

Figure 6:
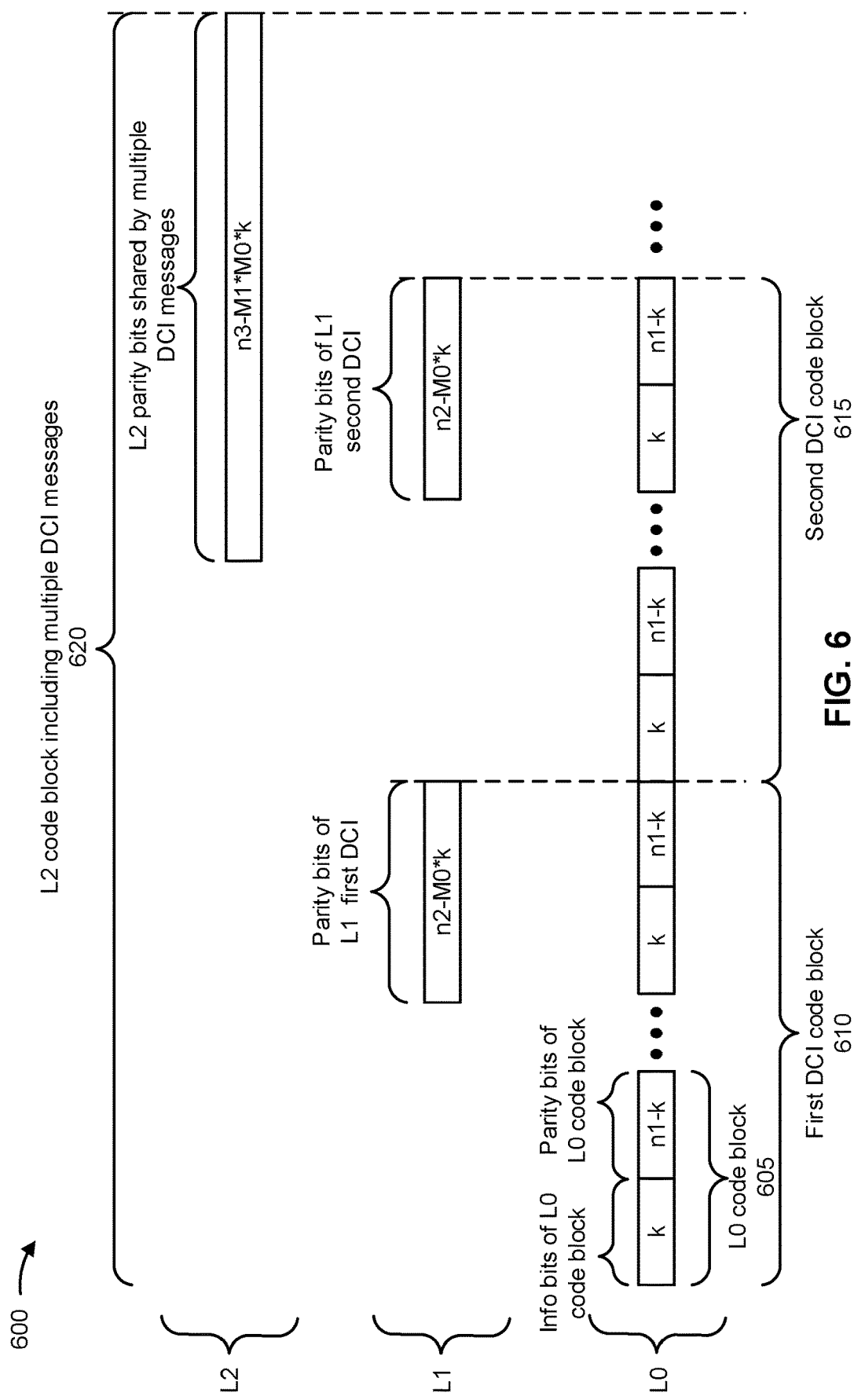

FIG. 6 is a diagram of an example 600 associated with communicating using a hierarchical coding scheme, in accordance with the present disclosure. As shown in FIG. 6, wireless communication devices (e.g., base station 110 and/or UE 120) may communicate using the hierarchical coding scheme. In some aspects, the wireless communication devices may be part of a wireless network (e.g., wireless network 100). The wireless communication devices may have established a wireless connection prior to operations shown in FIG. 6. In some aspects, the wireless communication devices may communicate in a high-frequency band, such as FR3 or FR4 or higher. An encoded communication associated with the hierarchical coding scheme shown in FIG. 6 may include multiple DCI messages or a multi-stage DCI message, among other examples.

As shown in FIG. 6, the hierarchical coding scheme may include multiple L0 code blocks 605 at a layer 0 (e.g., first layer) of the hierarchical coding scheme. An L0 code block includes k information bits of the L0 code block and (n1−k) L0 parity bits of the L0 code block. The L0 code block includes a portion of a first DCI message.

The hierarchical coding scheme may also include a first DCI code block 610 at layer 1 (e.g., second layer) of the hierarchical coding scheme. The first DCI code block 610 includes (n2−M0*k) L1 parity bits of the first DCI code block 610. The first DCI code block 610 may be associated with multiple L0 code blocks (e.g., as a parent code block to multiple L0 child code blocks). The L1 parity bits may be used to correct information blocks of any of the L0 code blocks associated with the first DCI code block 610. The first DCI code block 610 includes the first DCI message (e.g., an entire DCI message or a first stage of a multi-stage DCI message).

The hierarchical coding scheme may also include a second DCI code block 615 at layer 1 (e.g., second layer) of the hierarchical coding scheme. The second DCI code block 615 includes (n2−M0*k) L1 parity bits of the second DCI code block 615. The second DCI code block 615 may be associated with multiple L0 code blocks (e.g., as a parent code block to multiple L0 child code blocks). The L1 parity bits may be used to correct information blocks of any of the L0 code blocks associated with the second DCI code block 615. The second DCI code block 615 includes the second DCI message (e.g., an entire DCI message or a second stage of a multi-stage DCI message).

The hierarchical coding scheme may also include one or more L2 code blocks 620 including multiple DCI messages at layer 2 (e.g., a third layer) of the hierarchical coding scheme. An L2 code block includes (n3−M1*M0*k) L2 parity bits of the L2 code block. The L2 code block may be associated with the first DCI code block 610 and the second DCI code block 615 (e.g., as a parent code block). The L2 parity bits may be used to correct information blocks of any of the L0 code blocks associated with the first DCI code block 610 or the second DCI code block 615 (e.g., L0 code blocks that are grandchildren of the L2 code block). In this way, a receiving device (e.g., a receiving wireless communication device) may use a decoding of the first DCI message to assist in decoding the second DCI message, thereby improving decoding success rates and decreasing resources consumed for re-transmitting the second DCI message.

As indicated above, FIG. 6 is provided as an example. Other examples may differ from what is described with regard to FIG. 6.

Figure 7:
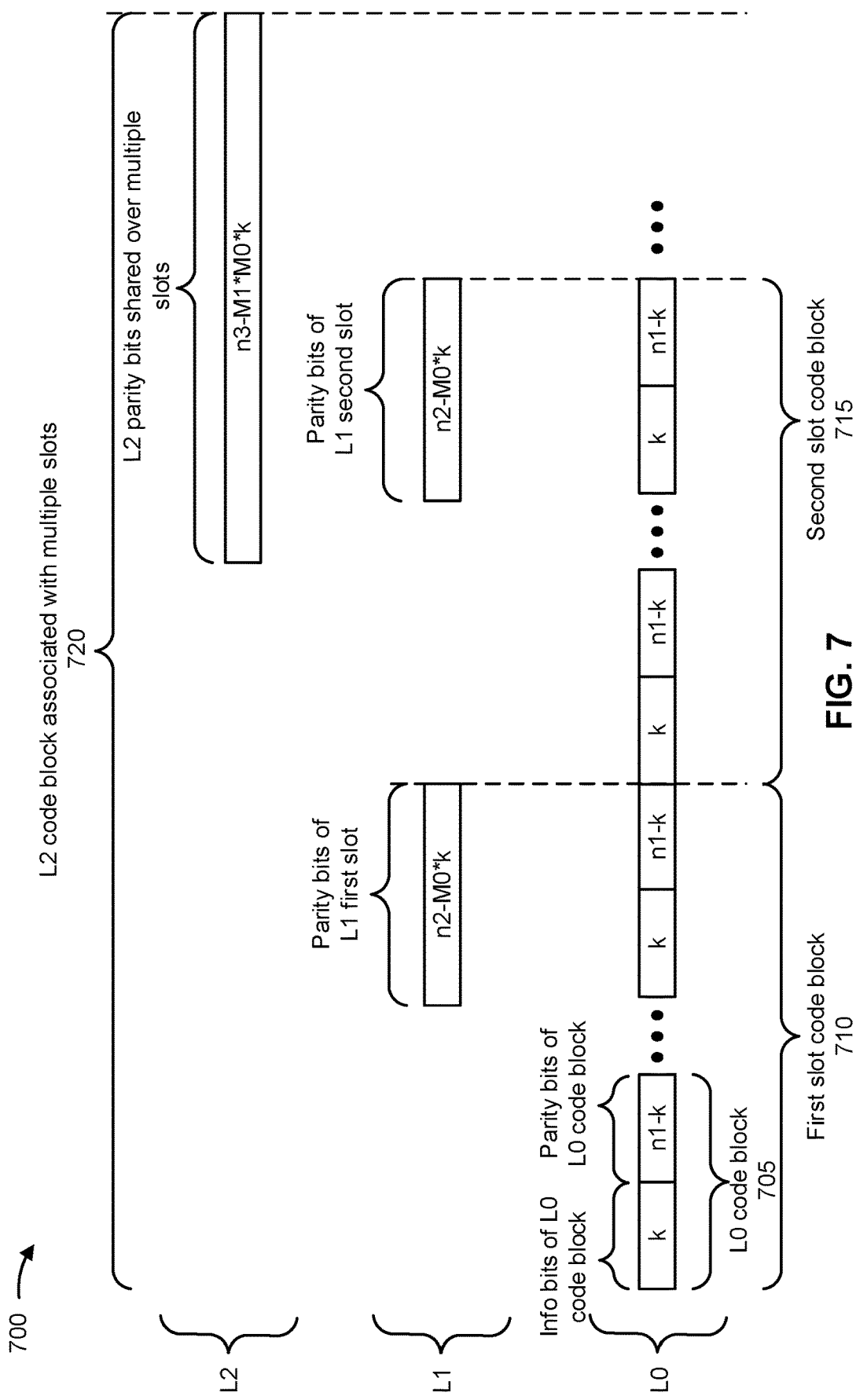

FIG. 7 is a diagram of an example 700 associated with communicating using a hierarchical coding scheme, in accordance with the present disclosure. As shown in FIG. 7, wireless communication devices (e.g., base station 110 and/or UE 120) may communicate using the hierarchical coding scheme. In some aspects, the wireless communication devices may be part of a wireless network (e.g., wireless network 100). The wireless communication devices may have established a wireless connection prior to operations shown in FIG. 7. In some aspects, the wireless communication devices may communicate in a high-frequency band, such as FR3 or FR4 or higher. An encoded communication associated with the hierarchical coding scheme shown in FIG. 7 may include a multi-slot communication or multiple communications communicated over multiple slots, among other examples.

As shown in FIG. 7, the hierarchical coding scheme may include multiple L0 code blocks 705 at a layer 0 (e.g., first layer) of the hierarchical coding scheme. An L0 code block includes k information bits of the L0 code block and (n1−k) L0 parity bits of the L0 code block. The L0 code block includes a portion of a first DCI message.

The hierarchical coding scheme may also include a first slot code block 710 at layer 1 (e.g., second layer) of the hierarchical coding scheme. The first slot code block 710 includes (n2−M0*k) L1 parity bits of the first slot code block 710. The first slot code block 710 may be associated with multiple L0 code blocks (e.g., as a parent code block to multiple L0 child code blocks). The L1 parity bits may be used to correct information blocks of any of the L0 code blocks associated with the first slot code block 710. The first slot code block 710 includes the first slot message (e.g., an entire message or a first slot of a multi-slot message).

The hierarchical coding scheme may also include a second slot code block 715 at layer 1 (e.g., second layer) of the hierarchical coding scheme. The second slot code block 715 includes (n2−M0*k) L1 parity bits of the second slot code block 715. The second slot code block 715 may be associated with multiple L0 code blocks (e.g., as a parent code block to multiple L0 child code blocks). The L1 parity bits may be used to correct information blocks of any of the L0 code blocks associated with the second slot code block 715. The second slot code block 715 includes the second slot message (e.g., an entire message or a second slot of a multi-slot message).

The hierarchical coding scheme may also include one or more L2 code blocks 720 associated with multiple slots at layer 2 (e.g., a third layer) of the hierarchical coding scheme. An L2 code block includes (n3−M1*M0*k) L2 parity bits of the L2 code block. The L2 code block may be associated with the first slot code block 710 and the second slot code block 715 (e.g., as a parent code block). The L2 parity bits may be used to correct information blocks of any of the L0 code blocks associated with the first slot code block 710 or the second slot code block 715 (e.g., L0 code blocks that are grandchildren of the L2 code block). In this way, a receiving device (e.g., a receiving wireless communication device) may use a decoding of the second slot message to assist in decoding the first slot message, thereby improving decoding success rates and decreasing resources consumed for re-transmitting the first slot message.

Figure 8:
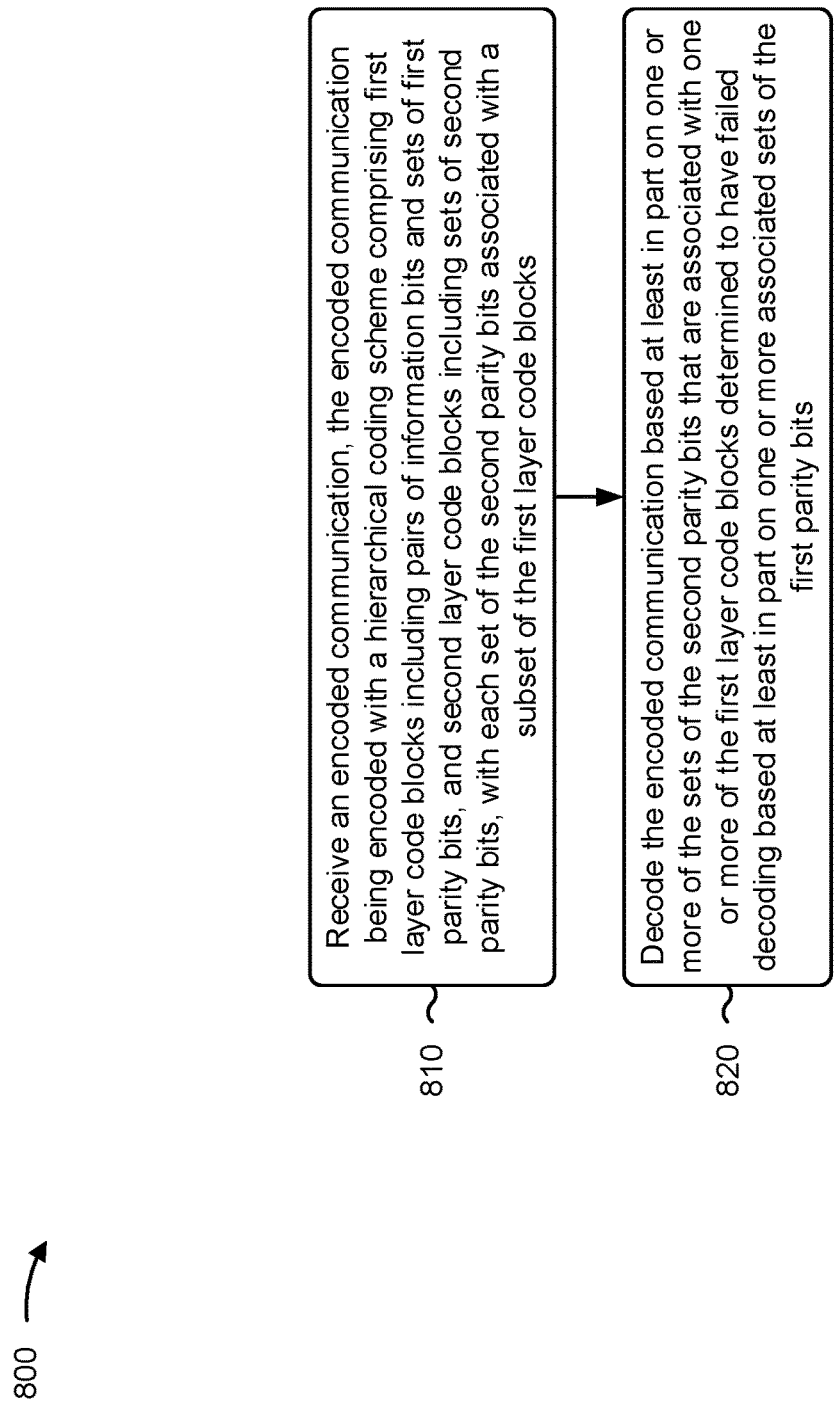
FIG. 8 is a diagram illustrating an example process associated with a hierarchical coding scheme, in accordance with the present disclosure.

FIG. 8 is a diagram illustrating an example process 800 performed, for example, by a wireless communication device, in accordance with the present disclosure. Example process 800 is an example where the wireless communication device (e.g., UE 120 or base station 110) performs operations associated with communicating using a hierarchical coding scheme.

As shown in FIG. 8, in some aspects, process 800 may include receiving an encoded communication, the encoded communication being encoded with a hierarchical coding scheme comprising first layer code blocks including pairs of information bits and sets of first parity bits, and second layer code blocks including sets of second parity bits, with each set of the second parity bits associated with a subset of the first layer code blocks (block 810). For example, the wireless communication device (e.g., using communication manager 140 and/or reception component 902, depicted in FIG. 9, or using communication manager 150 and/or reception component 1002, depicted in FIG. 10) may receive an encoded communication, the encoded communication being encoded with a hierarchical coding scheme comprising first layer code blocks including pairs of information bits and sets of first parity bits, and second layer code blocks including sets of second parity bits, with each set of the second parity bits associated with a subset of the first layer code blocks, as described above.

As further shown in FIG. 8, in some aspects, process 800 may include decoding the encoded communication based at least in part on one or more of the sets of the second parity bits that are associated with one or more of the first layer code blocks determined to have failed decoding based at least in part on one or more associated sets of the first parity bits (block 820). For example, the wireless communication device (e.g., using communication manager 140 and/or reception component 902, depicted in FIG. 9, or using communication manager 150 and/or reception component 1002, depicted in FIG. 10) may decode the encoded communication based at least in part on one or more of the sets of the second parity bits that are associated with one or more of the first layer code blocks determined to have failed decoding based at least in part on one or more associated sets of the first parity bits, as described above.

Process 800 may include additional aspects, such as any single aspect or any combination of aspects described below and/or in connection with one or more other processes described elsewhere herein.

In a first aspect, process 800 includes receiving an indication of a configuration of the hierarchical coding scheme, or transmitting the indication of the configuration of the hierarchical coding scheme.

In a second aspect, alone or in combination with the first aspect, the configuration indicates one or more of a number of the first layer code blocks, a number of the first layer code blocks associated with each of the second layer code blocks, a number of the second layer code blocks, a number of bits of the first parity bits associated with a first layer code block, a number of bits of the second parity bits associated with a second layer code block, or a number of layers of the hierarchal coding scheme.

In a third aspect, alone or in combination with one or more of the first and second aspects, the hierarchical coding scheme comprises a Bose-Chaudhuri-Hocquenghem coding scheme.

In a fourth aspect, alone or in combination with one or more of the first through third aspects, the first parity bits are associated with a capability to correct a first number of incorrectly received bits of the information bits, wherein the second parity bits are associated with a capability to correct a second number of incorrectly received bits of the information bits, and wherein the second number is greater than the first number.

In a fifth aspect, alone or in combination with one or more of the first through fourth aspects, a first number of bits of the first parity bits associated with a set of first layer code blocks that are associated with a second layer code block is greater than a second number of bits of the second parity bits associated with the second layer code block.

In a sixth aspect, alone or in combination with one or more of the first through fifth aspects, process 800 includes transmitting ACK feedback associated with the encoded communication, wherein the ACK feedback indicates one or more of an ACK or a NACK associated with multiple layers of the hierarchical coding scheme.

In a seventh aspect, alone or in combination with one or more of the first through sixth aspects, the hierarchical coding scheme comprises a third layer code block including a set of third parity bits that is associated with a set of the second layer code blocks, wherein the set of second layer code blocks are received over multiple slots.

In an eighth aspect, alone or in combination with one or more of the first through seventh aspects, process 800 includes transmitting ACK feedback associated with the encoded communication after the multiple slots.

In a ninth aspect, alone or in combination with one or more of the first through eighth aspects, receiving the encoded communication comprises receiving the set of third parity bits over each of the multiple slots, receiving the set of third parity bits over a subset of the multiple slots, or receiving different portions of the set of third parity bits over the multiple slots.

In a tenth aspect, alone or in combination with one or more of the first through ninth aspects, the hierarchical coding scheme comprises a set of third parity bits that are associated with groups of the set of the second parity bits, wherein the set of third parity bits is associated with the encoded communication and an additional encoded communication.

In an eleventh aspect, alone or in combination with one or more of the first through tenth aspects, the encoded communication comprises a first stage DCI message and the additional encoded communication comprises a second stage DCI.

In a twelfth aspect, alone or in combination with one or more of the first through eleventh aspects, code blocks associated with the encoded communication are systematic, or wherein code blocks associated with the encoded communication are non-systematic.

In a thirteenth aspect, alone or in combination with one or more of the first through twelfth aspects, the wireless communication device comprises, or is comprised in, a user equipment or a base station.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
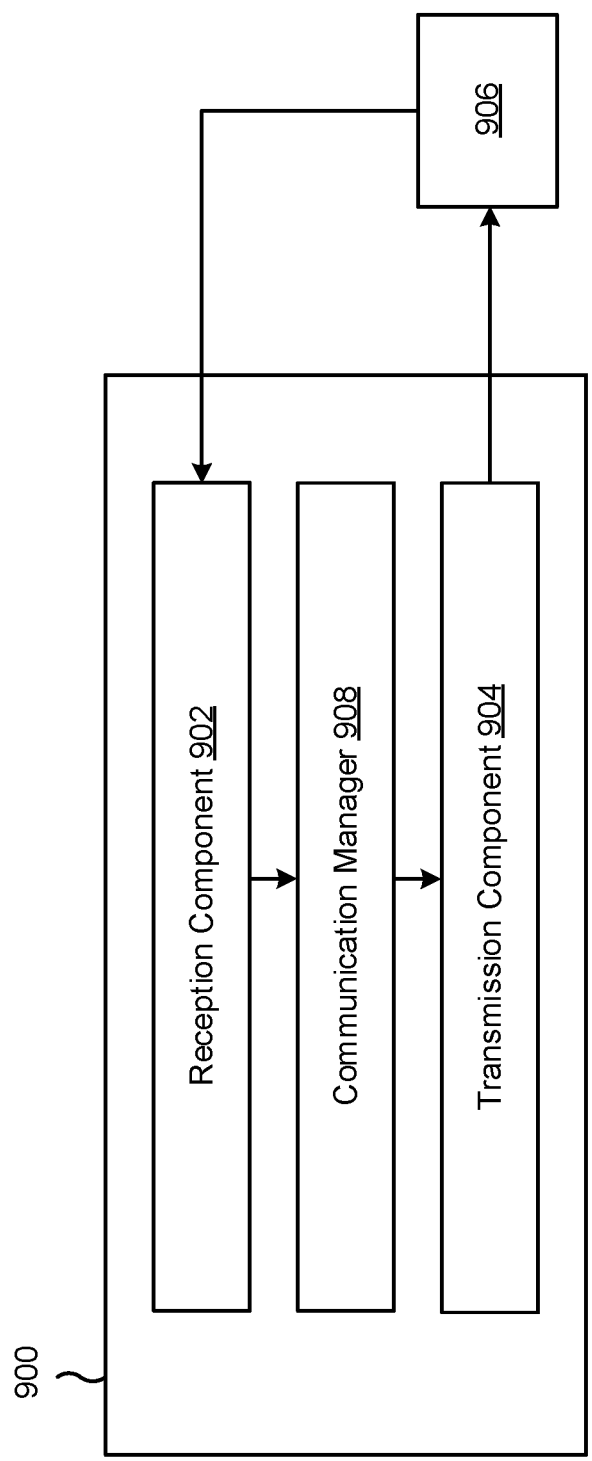
FIGS. 9-10 are diagrams of example apparatuses for wireless communication, in accordance with the present disclosure.

FIG. 9 is a diagram of an example apparatus 900 for wireless communication. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the a communication manager 908 (e.g., communication manager 140). The communication manager 908 may configure the reception component 902 or the transmission component 904 to communicate with the apparatus 906. For example, the communication manager 908 may configure the reception component 902 for decoding an encoded communication using a hierarchical coding scheme, and/or may configure the transmission component 904 to encode a communication using the hierarchical coding scheme.

In some aspects, the apparatus 900 may be configured to perform one or more operations described herein in connection with FIGS. 4-7. Additionally, or alternatively, the apparatus 900 may be configured to perform one or more processes described herein, such as process 800 of FIG. 8, or a combination thereof. In some aspects, the apparatus 900 and/or one or more components shown in FIG. 9 may include one or more components of the UE described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the UE described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the UE described in connection with FIG. 2. In some aspects, the transmission component 904 may be co-located with the reception component 902 in a transceiver.

The reception component 902 may receive an encoded communication, the encoded communication being encoded with a hierarchical coding scheme comprising first layer code blocks including pairs of information bits and sets of first parity bits, and second layer code blocks including sets of second parity bits, with each set of the second parity bits associated with a subset of the first layer code blocks. The reception component 902 may decode the encoded communication based at least in part on one or more of the sets of the second parity bits that are associated with one or more of the first layer code blocks determined to have failed decoding based at least in part on one or more associated sets of the first parity bits.

The reception component 902 may receive an indication of a configuration of the hierarchical coding scheme.

The transmission component 904 may transmit the indication of the configuration of the hierarchical coding scheme.

The transmission component 904 may transmit ACK feedback associated with the encoded communication, wherein the ACK feedback indicates one or more of an ACK or a NACK associated with multiple layers of the hierarchical coding scheme.

The transmission component 904 may transmit ACK feedback associated with the encoded communication after the multiple slots.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
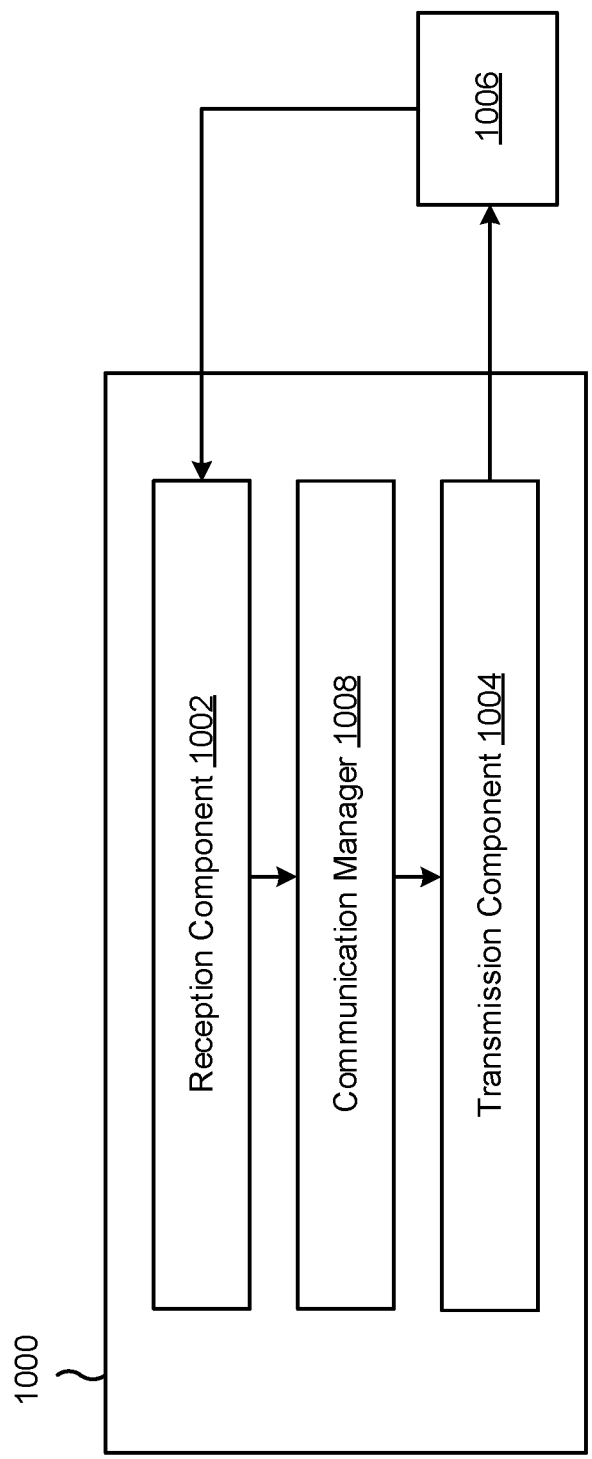

FIG. 10 is a diagram of an example apparatus 1000 for wireless communication. The apparatus 1000 may be a base station, or a base station may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include a communication manager 1008 (e.g., the communication manager 150). The communication manager 1008 may configure the reception component 1002 or the transmission component 1004 to communicate with the apparatus 1006. For example, the communication manager 1008 may configure the reception component 1002 for decoding an encoded communication using a hierarchical coding scheme, and/or may configure the transmission component 1004 to encode a communication using the hierarchical coding scheme.

In some aspects, the apparatus 1000 may be configured to perform one or more operations described herein in connection with FIGS. 4-7. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the base station described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the base station described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the base station described in connection with FIG. 2. In some aspects, the transmission component 1004 may be co-located with the reception component 1002 in a transceiver.

The reception component 1002 may receive an encoded communication, the encoded communication being encoded with a hierarchical coding scheme comprising first layer code blocks including pairs of information bits and sets of first parity bits, and second layer code blocks including sets of second parity bits, with each set of the second parity bits associated with a subset of the first layer code blocks. The reception component 1002 may decode the encoded communication based at least in part on one or more of the sets of the second parity bits that are associated with one or more of the first layer code blocks determined to have failed decoding based at least in part on one or more associated sets of the first parity bits.

The reception component 1002 may receive an indication of a configuration of the hierarchical coding scheme.

The transmission component 1004 may transmit the indication of the configuration of the hierarchical coding scheme.

The transmission component 1004 may transmit ACK feedback associated with the encoded communication, wherein the ACK feedback indicates one or more of an ACK or a NACK associated with multiple layers of the hierarchical coding scheme.

The transmission component 1004 may transmit ACK feedback associated with the encoded communication after the multiple slots.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a wireless communication device, comprising: receiving an encoded communication, the encoded communication being encoded with a hierarchical coding scheme comprising: first layer code blocks including pairs of information bits and sets of first parity bits, and second layer code blocks including sets of second parity bits, with each set of the second parity bits associated with a subset of the first layer code blocks; and decoding the encoded communication based at least in part on one or more of the sets of the second parity bits that are associated with one or more of the first layer code blocks determined to have failed decoding based at least in part on one or more associated sets of the first parity bits.

Aspect 2: The method of Aspect 1, further comprising: receiving an indication of a configuration of the hierarchical coding scheme, or transmitting the indication of the configuration of the hierarchical coding scheme.

Aspect 3: The method of Aspect 2, wherein the configuration indicates one or more of: a number of the first layer code blocks, a number of the first layer code blocks associated with each of the second layer code blocks, a number of the second layer code blocks, a number of bits of the first parity bits associated with a first layer code block, a number of bits of the second parity bits associated with a second layer code block, or a number of layers of the hierarchal coding scheme.

Aspect 4: The method of any of Aspects 1-3, wherein the hierarchical coding scheme comprises a Bose-Chaudhuri-Hocquenghem coding scheme.

Aspect 5: The method of any of Aspects 1-4, wherein the first parity bits are associated with a capability to correct a first number of incorrectly received bits of the information bits, wherein the second parity bits are associated with a capability to correct a second number of incorrectly received bits of the information bits, and wherein the second number is greater than the first number.

Aspect 6: The method of any of Aspects 1-5, wherein a first number of bits of the first parity bits associated with a set of first layer code blocks that are associated with a second layer code block is greater than a second number of bits of the second parity bits associated with the second layer code block.

Aspect 7: The method of any of Aspects 1-6, further comprising transmitting acknowledgment (ACK) feedback associated with the encoded communication, wherein the ACK feedback indicates one or more of an ACK or a negative ACK (NACK) associated with multiple layers of the hierarchical coding scheme.

Aspect 8: The method of any of Aspects 1-7, wherein the hierarchical coding scheme comprises: a third layer code block including a set of third parity bits that is associated with a set of the second layer code blocks, wherein the set of second layer code blocks are received over multiple slots.

Aspect 9: The method of Aspect 8, further comprising: transmitting acknowledgment (ACK) feedback associated with the encoded communication after the multiple slots.

Aspect 10: The method of any of Aspects 8-9, wherein receiving the encoded communication comprises: receiving the set of third parity bits over each of the multiple slots, receiving the set of third parity bits over a subset of the multiple slots, or receiving different portions of the set of third parity bits over the multiple slots.

Aspect 11: The method of any of Aspects 1-10, wherein the hierarchical coding scheme comprises: a set of third parity bits that are associated with groups of the set of the second parity bits, wherein the set of third parity bits is associated with the encoded communication and an additional encoded communication.

Aspect 12: The method of Aspect 11, wherein the encoded communication comprises a first stage downlink control information (DCI) message and the additional encoded communication comprises a second stage DCI.

Aspect 13: The method of any of Aspects 1-12, wherein code blocks associated with the encoded communication are systematic, or wherein code blocks associated with the encoded communication are non-systematic.

Aspect 14: The method of any of Aspects 1-13, wherein the wireless communication device comprises, or is comprised in, a user equipment or a base station.

Aspect 15: An apparatus for wireless communication at a device, comprising a processor; memory coupled with the processor; and instructions stored in the memory and executable by the processor to cause the apparatus to perform the method of one or more of Aspects 1-14.

Aspect 16: A device for wireless communication, comprising a memory and one or more processors coupled to the memory, the one or more processors configured to perform the method of one or more of Aspects 1-14.

Aspect 17: An apparatus for wireless communication, comprising at least one means for performing the method of one or more of Aspects 1-14.

Aspect 18: A non-transitory computer-readable medium storing code for wireless communication, the code comprising instructions executable by a processor to perform the method of one or more of Aspects 1-14.

Aspect 19: A non-transitory computer-readable medium storing a set of instructions for wireless communication, the set of instructions comprising one or more instructions that, when executed by one or more processors of a device, cause the device to perform the method of one or more of Aspects 1-14.

The foregoing disclosure provides illustration and description but is not intended to be exhaustive or to limit the aspects to the precise forms disclosed. Modifications and variations may be made in light of the above disclosure or may be acquired from practice of the aspects.

Further disclosure is included in the appendix. The appendix is provided as an example only and is to be considered part of the specification. A definition, illustration, or other description in the appendix does not supersede or override similar information included in the detailed description or figures. Furthermore, a definition, illustration, or other description in the detailed description or figures does not supersede or override similar information included in the appendix. Furthermore, the appendix is not intended to limit the disclosure of possible aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a wireless communication device, comprising:
    receiving an encoded communication, the encoded communication being encoded with a hierarchical coding scheme comprising:
        first layer code blocks including pairs of information bits and sets of first parity bits, and
        second layer code blocks including sets of second parity bits, with each set of the second parity bits associated with a subset of the first layer code blocks; and
    decoding the encoded communication based at least in part on one or more of the sets of the second parity bits that are associated with one or more of the first layer code blocks determined to have failed decoding based at least in part on one or more associated sets of the first parity bits.

2. The method of claim 1, further comprising:
    receiving an indication of a configuration of the hierarchical coding scheme, or
    transmitting the indication of the configuration of the hierarchical coding scheme.

3. The method of claim 2, wherein the configuration indicates one or more of:
    a number of the first layer code blocks,
    a number of the first layer code blocks associated with each of the second layer code blocks,
    a number of the second layer code blocks,
    a number of bits of the first parity bits associated with a first layer code block,
    a number of bits of the second parity bits associated with a second layer code block, or
    a number of layers of the hierarchal coding scheme.

4. The method of claim 1, wherein the hierarchical coding scheme comprises a Bose-Chaudhuri-Hocquenghem coding scheme.

5. The method of claim 1, wherein the first parity bits are associated with a capability to correct a first number of incorrectly received bits of the information bits,
    wherein the second parity bits are associated with a capability to correct a second number of incorrectly received bits of the information bits, and
    wherein the second number is greater than the first number.

6. The method of claim 1, wherein a first number of bits of the first parity bits associated with a set of first layer code blocks that are associated with a second layer code block is greater than a second number of bits of the second parity bits associated with the second layer code block.

7. The method of claim 1, further comprising transmitting acknowledgment (ACK) feedback associated with the encoded communication,
    wherein the ACK feedback indicates one or more of an ACK or a negative ACK (NACK) associated with multiple layers of the hierarchical coding scheme.

8. The method of claim 1, wherein the hierarchical coding scheme comprises:
    a third layer code block including a set of third parity bits that is associated with a set of the second layer code blocks,
    wherein the set of second layer code blocks are received over multiple slots.

9. The method of claim 8, further comprising:
    transmitting acknowledgment (ACK) feedback associated with the encoded communication after the multiple slots.

10. The method of claim 8, wherein receiving the encoded communication comprises:
    receiving the set of third parity bits over each of the multiple slots,
    receiving the set of third parity bits over a subset of the multiple slots, or
    receiving different portions of the set of third parity bits over the multiple slots.

11. The method of claim 1, wherein the hierarchical coding scheme comprises:
    a set of third parity bits that are associated with groups of the set of the second parity bits,
    wherein the set of third parity bits is associated with the encoded communication and an additional encoded communication.

12. The method of claim 11, wherein the encoded communication comprises a first stage downlink control information (DCI) message and the additional encoded communication comprises a second stage DCI.

13. The method of claim 1, wherein code blocks associated with the encoded communication are systematic or,
    wherein the code blocks associated with the encoded communication are non-systematic.

14. The method of claim 1, wherein the wireless communication device comprises, or is comprised in, a user equipment or a base station.

15. A wireless communication device for wireless communication, comprising:
    a memory; and
    one or more processors, coupled to the memory, configured to:
        receive an encoded communication, the encoded communication being encoded with a hierarchical coding scheme comprising:
            first layer code blocks including pairs of information bits and sets of first parity bits, and
            second layer code blocks including sets of second parity bits, with each set of the second parity bits associated with a subset of the first layer code blocks; and
        decode the encoded communication based at least in part on one or more of the sets of the second parity bits that are associated with one or more of the first layer code blocks determined to have failed decoding based at least in part on one or more associated sets of the first parity bits.

16. The wireless communication device of claim 15, wherein the one or more processors are further configured to:

receive an indication of a configuration of the hierarchical coding scheme, or transmit the indication of the configuration of the hierarchical coding scheme.

17. The wireless communication device of claim 16, wherein the configuration indicates one or more of:
a number of the first layer code blocks,
a number of the first layer code blocks associated with each of the second layer code blocks,
a number of the second layer code blocks,
a number of bits of the first parity bits associated with a first layer code block,
a number of bits of the second parity bits associated with a second layer code block, or
a number of layers of the hierarchal coding scheme.

18. The wireless communication device of claim 15, wherein the hierarchical coding scheme comprises a Bose-Chaudhuri-Hocquenghem coding scheme.

19. The wireless communication device of claim 15, wherein the first parity bits are associated with a capability to correct a first number of incorrectly received bits of the information bits,
wherein the second parity bits are associated with a capability to correct a second number of incorrectly received bits of the information bits, and
wherein the second number is greater than the first number.

20. The wireless communication device of claim 15, wherein a first number of bits of the first parity bits associated with a set of first layer code blocks that are associated with a second layer code block is greater than a second number of bits of the second parity bits associated with the second layer code block.

21. The wireless communication device of claim 15, wherein the one or more processors are further configured to transmit acknowledgment (ACK) feedback associated with the encoded communication,
wherein the ACK feedback indicates one or more of an ACK or a negative ACK (NACK) associated with multiple layers of the hierarchical coding scheme.

22. The wireless communication device of claim 15, wherein the hierarchical coding scheme comprises:
a third layer code block including a set of third parity bits that is associated with a set of the second layer code blocks,
wherein the set of second layer code blocks are received over multiple slots.

23. The wireless communication device of claim 22, wherein the one or more processors are further configured to:
transmit acknowledgment (ACK) feedback associated with the encoded communication after the multiple slots.

24. The wireless communication device of claim 22, wherein the one or more processors, to receive the encoded communication, are configured to:
receive the set of third parity bits over each of the multiple slots,
receive the set of third parity bits over a subset of the multiple slots, or
receive different portions of the set of the third parity bits over the multiple slots.

25. The wireless communication device of claim 15, wherein the hierarchical coding scheme comprises:
a set of third parity bits that are associated with groups of the set of the second parity bits,
wherein the set of third parity bits is associated with the encoded communication and an additional encoded communication.

26. The wireless communication device of claim 25, wherein the encoded communication comprises a first stage downlink control information (DCI) message and the additional encoded communication comprises a second stage DCI.

27. The wireless communication device of claim 15, wherein code blocks associated with the encoded communication are systematic, or
wherein code blocks associated with the encoded communication are non-systematic.

28. The wireless communication device of claim 15, wherein the wireless communication device comprises, or is comprised in, a user equipment or a base station.

29. A non-transitory computer-readable medium storing a set of instructions for wireless communication, the set of instructions comprising:
one or more instructions that, when executed by one or more processors of a wireless communication device, cause the wireless communication device to:
receive an encoded communication, the encoded communication being encoded with a hierarchical coding scheme comprising:
first layer code blocks including pairs of information bits and sets of first parity bits, and
second layer code blocks including sets of second parity bits, with each set of the second parity bits associated with a subset of the first layer code blocks; and
decode the encoded communication based at least in part on one or more of the sets of the second parity bits that are associated with one or more of the first layer code blocks determined to have failed decoding based at least in part on one or more associated sets of the first parity bits.

30. An apparatus for wireless communication, comprising:
means for receiving an encoded communication, the encoded communication being encoded with a hierarchical coding scheme comprising:
first layer code blocks including pairs of information bits and sets of first parity bits, and
second layer code blocks including sets of second parity bits, with each set of the second parity bits associated with a subset of the first layer code blocks; and
means for decoding the encoded communication based at least in part on one or more of the sets of the second parity bits that are associated with one or more of the first layer code blocks determined to have failed decoding based at least in part on one or more associated sets of the first parity bits.

* * * * *